Oct. 6, 1942.   T. A. READ   2,297,800
STANDARD FREQUENCY OSCILLATOR
Filed Nov. 1, 1941
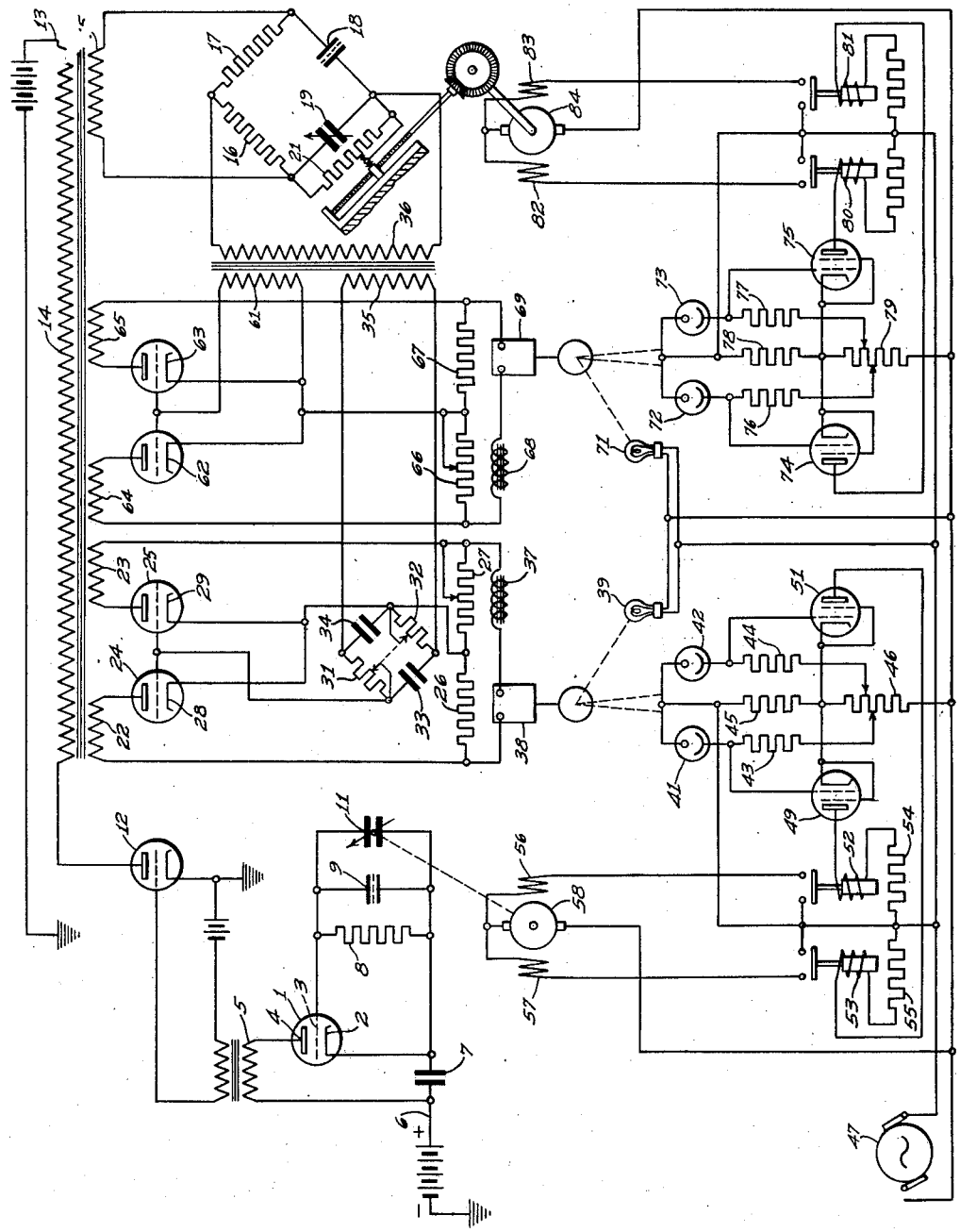
WITNESSES:
C. J. Weller
Wm. E. Groome
INVENTOR
Thomas A. Read.
BY
F. W. Lyle
ATTORNEY Patented Oct. 6, 1942

2,297,800

UNITED STATES PATENT OFFICE 2,297,800

STANDARD FREQUENCY OSCILLATOR

Thomas A. Read, Philadelphia, Pa., assignor to Westinghouse Electric & Manufacturing Company, East Pittsburgh, Pa., a corporation of Pennsylvania Application November 1, 1941, Serial No. 417,511

6 Claims. (Cl. 250—36)

My invention relates to oscillators for producing a predetermined standard frequency and particularly to oscillators of which the frequency is fixed by quartz crystals or other electro-mechanical vibratory systems.

One object of my invention is to provide an oscillator of which the frequency shall be maintained in highly exact equality to the natural vibration frequency of an electro-mechanical vibrator not withstanding variations in the plate voltage impressed on the oscillator or in interelectrode capacitances or in changes with time of vacuum-tube characteristics.

Another object of my invention is to provide an arrangement in which a quartz crystal or other electro-mechanical vibrator is maintained in vibration by means of an electrical input system at precisely its natural vibration frequency.

Another object of my invention is to provide an arrangement whereby an oscillation generator controlled by the quartz crystals or other electro-mechanical vibrator is caused to generate frequency exactly equal to the natural vibration period of another electro-mechanical vibrator such as a quartz crystal.

Still another object of my invention is to provide a regulating circuit for adjusting the frequency of vibration of an oscillator controlled by a quartz crystal or other electro-mechanical vibrator automatic to the rate of vibration of a standard electro-mechanical vibrator such as a quartz crystal.

Still another object of my invention is to provide an electrical regulator which shall respond by producing adjustments in one sense in response to departures of the frequency of vibration of an electrical oscillator from equality to the frequency of a standard mechanical vibrator, and which produces adjustments in the opposite sense for departure in the opposite direction of the frequency of said oscillator from equality to the frequency of said electro-mechanical vibrator.

Other objects of my invention will become apparent when reading the following specification taken in connection with the single figure of drawing which is a diagrammatic illustration of a circuit adapted to embody the principles of my invention.

It has become common practice in the electrical art to employ electro-mechanical vibrators, which have a natural period of vibration, as for example piezo electric crystals and specifically quartz crystals to control the frequency of oscillation of electronic tubes employing three or more electrodes. One common circuit for this purpose employs a three-electrode tube having a quartz crystal shunted by a resistor in circuit between its grid electrode and its cathode, the circuit between the anode and the cathode comprising a source of direct current voltage and a conventional output circuit. In such an arrangement the frequency of oscillation of the electrogenerator is very closely equal to the natural frequency of mechanical vibration of the quartz crystal; however it is not exactly equal to the latter, but varies therefrom by an amount dependent upon numerous factors such as the plate voltage applied to the tube, the electrical characteristics of the tube itself, the impedance of the output circuit and the capacity between the electrode plates which embrace the quartz crystals. I have devised the following arrangement which makes it possible to cause an electronic tube employing principal and control electrodes to operate at a frequency exactly equal to the natural frequency of vibration of a mechanical vibrator. This I accomplished by the employment of two electro vibrators, for example, quartz crystals. One of which I shall hereafter refer to as "auxiliary vibrator" and the other of which I shall refer to as the "control vibrator." Further details of my arrangement will be evident from reference to the drawing in which a three electrode tube 1 provided with a conventional cathode 2, control electrode 3 and anode 4 is connected through an output transformer 5 to a source of anode potential. A blocking capacitor 7 may be connected to span the anode potential source between its positive terminal 6 and the cathode 2. Between the control electrode 3 and the cathode 2 are connected a resistor 8, a quartz crystal 9 of conventional type which constitutes the "auxiliary vibrator," and an adjusting capacitor 11. The secondary winding of the transformer 5 is connected between the control electrode and cathode of an amplifier tube 12 which may be of any suitable conventional type. Between the anode of the tube 12 and a source of direct current voltage 13 is connected the primary winding 14 of an output transformer. One secondary winding 15 of this output transformer is connected to the diagonal opposite corners of a first bridge circuit comprising on two adjacent sides two serially connected resistors 16—17, and on the other two sides a mechanical vibrator such as a quartz crystal 18 connected in series with a compound circuit comprising a capacitor 19 and an adjustable resistor 21 connected in parallel with each other. The quartz crystal 18 constitutes the "control vibrator". The general mode of operation of my invention may conveniently be explained at this point by reference to the circuit elements so far mentioned.

The oscillator 1 will produce electrical oscillations having a frequency very nearly equal to the natural period of vibration of the "auxiliary vibrator" 9, but may be made to differ slightly from the latter in an amount which can be varied by adjusting the variable capacitor 11. The "auxiliary vibrator" 9 is originally made to have a frequency slightly lower than that of the "control vibrator" 18, the difference between the two being made to fall within the range which can be covered by varying the capacitor 11. Electrical voltages having the frequency produced by the operation of the oscillator are impressed through the amplifier 12 and the transformer windings 14—15 across the diagonally opposite terminals comprising the remote terminals of resistors 16, 17 in the above-mentioned first bridge circuit. Using an "auxiliary vibrator" 9 having a frequency differs from that of "control vibrator" 18 by about 0.3 percent, the frequency of the generator 1 then being adjusted to differ by 100 cycles per second or less from the natural period of vibration of the "control vibrator" 18 and resistor 21 open-circuited, the condenser 19 is varied until its capacity is exactly equal to that between the electrodes of the "control vibrator" 18. The setting of the capacitor 19 then remains forever fixed at the value obtained.

The resistors 16—17 are made exactly equal to each other and to the resistance at resonance of the "control vibrator" 18, and the variable resistor 21 is made of such a value that the resistance last mentioned falls within its range of adjustment. With the variable resistor 21 set as closely as possible to the equality with resistors 16—17, it will be found that variation of the variable capacitor 11 will produce a condition in which the first bridge 16, 17, 18, 19 and 21 is exactly balanced; that is to say that no potential difference exists between the common junction of the resistors 16—17 and the diagonally opposite corner of the first bridge. When the capacitor 11 has been adjusted to this condition the frequency of the oscillations of the tube 1 is exactly equal to the natural frequency of vibration of the "control vibrator" 18.

If for any reason such as variation of its plate voltage, for example, the vibration frequency of the tube 1 undergoes an increase, a voltage of one polarity will be produced across the diagonally opposite terminals last mentioned of the first bridge. If the frequency of oscillations of tube 1 decreases for any reason to a value less than the natural period of vibrator 18 the polarity of the voltage across these diagonally opposite corners will reverse. It is accordingly possible by proper circuit arrangements to cause the voltage across the diagonally opposite corners of the first bridge to adjust the variable capacitor 11 up or down in just the sense needed to bring the frequency of the oscillator 1 back to equality with the natural period of mechanical vibration of the "control vibrator" 18. The following description will give the details of such a regulating arrangement for the capacitor 11.

A pair of oppositely poled secondary windings 22—23 derive energy from the primary transformer 14 and are connected respectively in series with the anodes of a pair of conventional amplifier tubes 24—25. The other ends of the windings 22 and 23 are connected to the outside terminals of a pair of serially connected resistors 26—27, one of which is made variable, and the common terminals of the resistors 26—27 are connected to the cathode 28—29 of the tubes 24—25. The control electrodes of the tubes 24—25 are connected to one terminal of a second bridge circuit comprising a pair of equal resistors 31—32 on opposite sides together with a pair of capacitors 33—34. The terminal of the second bridge diagonally opposite to that just mentioned is connected to the cathodes 28—29 of the tubes 24—25. A secondary winding 35 bridges the remaining diagonally opposite corners of the second bridge. A primary winding 36 associated with the secondary winding 35 is connected between the common junction of the resistors 16—17 in the first bridge and the common terminal of the "control vibrator" 18 and the capacitor 19 therein.

A moments consideration will show that whenever the natural period of vibration of the oscillator 1 differs from the natural period of vibration of the "control vibrator" 18 a voltage will be impressed across the diagonally opposite corners of the above mentioned second bridge and as a result of this a voltage dephased substantially 90° therefrom will be impressed across the cathodes and the control electrodes of the tubes 24—25. As a result the tubes 24—25 will impress across the outside terminals of the resistor channel 26—27 a direct-current voltage which will vary in polarity in conformance with the variations in polarity of the voltage impressed by the first mentioned bridge on the primary winding 36. Since the polarity of the voltage impressed on primary winding 36 depends in polarity upon whether the period of vibration of oscillator 1 is above or below the natural period of vibration of the "control vibrator" 18, the voltage appearing across the outside channel 26—27 will likewise depend in polarity upon whether the period of vibration of generator 1 is above or below the natural period of vibration of the "control vibrator" 18.

Across the terminals of the resistor channels 26—27 is connected a choke coil 37 and a galvanometer 38. The mirror of the galvanometer 38 is so arranged that in its undeflected state it reflects light from the source 39 to a point between a pair of photoelectric cells 41—42 but energizes neither one of these cells. The photoelectric cells 41—42 are connected in series with a pair of resistors 43—44 in shunt to a pair of serially connected resistors 45—46 which are in turn connected across the terminals of an alternating current source 47. The common junction of the resistors 45—46 is connected to the cathodes of a pair of amplifier tubes 49—51 of which the anodes are respectively connected through a pair of windings 52—53 which actuate relays fed from the alternating current source 47 by way of a pair of resistors 54—55. The tubes 49—51 are so biased so that when the photoelectric cells 41—42 are dark the associated tubes 49—51 are non-conductive and the contacts operated by the relays 52—53 are open-circuited.

When the galvanometer 38 deflects in one direction it energizes one of the photoelectric cells 41—42 thereby energizing the associated tube 49 or 51 as the case may be and energizes either the relay winding 53 or the relay winding 52. The contacts of the relays 52—53 are respectively connected in series with field windings 56 and 57 on an alternating current motor 58, these field windings being arranged so that when one field winding is energized the motor 58 rotates in one direction and when the other field winding is energized the motor rotates in the other direction. The shaft of the motor 58 turns the shaft of the variable capacitor 11 to increase or decrease its capacity in accordance with the direction of rotation of the motor 58.

It will thus be seen that if the frequency generated by the oscillator 1 falls below the natural frequency of the "control vibrator" 18 the voltage of one polarity is impressed across the primary winding 36 thereby deflecting the galvanometer 38 in one direction so as to energize one of the relays 53 or 52. The field winding which causes the motor 58 to turn in such a direction as to increase the generated frequency of oscillator 1 is connected to the relay thus energized. The other field winding of motor 58 is connected to the other relay and the circuit arrangements heretofore described are such that this other relay will be energized to vary the capacitor 11 in such a direction so as to decrease the frequency of the oscillation generator 1 whenever this other relay is energized by action of the winding 36. There is accordingly thus provided a system in which any departures of the frequency of the oscillator 1 from equality to the natural frequency of the "control vibrator" 18 causes an adjustment of the capacitor 11 which brings the frequency of oscillator 1 back to its original equality to that natural frequency.

It may be found under certain conditions that the setting of the resistor 21 will need to be varied in order to retain the value of this resistor always equal to the resistance of the "control vibrator" 18. The circuit elements now to be mentioned constitute an arrangement for automatically making this adjustment of the resistor 21. This arrangement comprises a secondary winding 61 energized from the primary winding 36 and connected between the cathodes and the control electrodes of a pair of amplifier tubes 62—63. The anode circuits of the amplifier tubes 62—63 are respectively connected through oppositely poled secondary winding 64—65 energized by the primary winding 14 in series with a pair of resistors 66—67, one of which is made variable. The common terminal of the resistor 66—67 is connected to the cathodes of the amplifier tubes 62—63. Across the terminals of the resistors 66—67 are connected a choke coil 68 and a galvanometer 69.

The mirror of the galvanometer 69 is so arranged that it reflects light from a source 71 between a pair of photoelectric cells 72—73 without striking the photoelectric surfaces of either. The photoelectric cells 72—73 are connected into the circuits of the control electrodes of a pair of amplifier tubes 74—75 which are energized by resistors 76, 77, 78 and 79 from the alternating current source 47 in exactly the same way as are the tubes 49—51 already described, for which reason it is believed that a separate detailed description of the circuits of tubes 74—75 is unnecessary. In short, it may be stated that when the galvanometer 69 is deflected in one direction it energizes one of the tubes 72—73 to close the contacts of a pair of relays 79—81 precisely as does deflection of the galvanometer 38 close contacts 33—32 already described. Closure of the contacts of relays 80 or 81, respectively, energizes one of the field windings 82—83 of a motor 84 in the same way as the closure of the contact relays 52—53 energizes one of the field windings of the motor 58. Rotation of the motor 84 in one direction or the other in response to the respective energization of the relays 80 or 81 decreases or increases the resistance 21 in the same way as operation of the motor 58 varies the capacitor 11 already described. The polarities of the connections of the circuits energized from secondaries 61 are made such that when the resistance of the resistor 21 is less than that of the "control vibrator" 18 the motor 84 is rotated in such a direction as to increase the resistance of resistor 21; and when the resistances of resistor 21 is greater than that of the "control vibrator" 18 the polarity of the voltage appearing across the primary winding 36 is such as to rotate motor 84 in such a direction as to decrease resistor 21.

It will accordingly be seen that I have devised an arrangement which reacts automatically to maintain the oscillation frequency of a generator 1 always equal to the natural frequency of vibration of a "control vibrator" 18.

To take a particular illustration of my invention the capacitor 11 may have a value of the order of $10^{-11}$ farads. The crystal 18 may have a Q of the power $10^6$ and a resistance of 1000 ohms and have a natural frequency $10^5$. Under these circumstances it can be shown that if the relays 53—52 and their associated circuits are made sufficiently quick in action so that the voltage impressed across the primary winding 36 is never more than 10% of the voltage impressed by the secondary winding 15 on the first bridge, the frequency of the oscillator 1 will never differ from the natural frequency of vibration of the "control vibrator" 18 by more than one part in ten billion.

The "control vibrator" 18 may, when desirable, be equipped with a thermostatic or other conventionally controlled enclosure to maintain its temperature as closely constant as possible in ways well known in the radio art.

I have described a particular embodiment of my invention but it will be evident to those skilled in the art that the principles thereof are of broad application and the foregoing description should accordingly be taken merely as one example of the way these principles may be practically employed.

I claim as my invention:

1. Means for producing alternating currents of a predetermined standard frequency comprising an electronic tube having an anode, a cathode and at least one control electrode, an electro-mechanical vibrator connected between the cathode and said control electrode, a vairable capacitor in shunt with said vibrator, a bridge having a pair of identical impedances in one pair of adjacent arms, a second electro-mechanical vibrator in the third arm and a capacitor shunted by a resistor in the fourth arm, said bridge being connected to have the non-adjacent terminals of said identical impedances impressed with a voltage generated in the output circuit of said electron tube, and means responsive to the voltage developed across the other diagonally opposite corners of said bridge to vary the first mentioned capacitor.

2. Means for producing alternating currents of a predetermined standard frequency comprising an electronic tube having an anode, a cathode and at least one control electrode, a piezoelectric crystal connected between the cathode and said control electrode, a variable capacitor in shunt with said crystal, a bridge having a pair of identical impedances in one pair of adjacent arms, a second electro-mechanical vibrator in the third arm and a capacitor shunted by a resistor in the fourth arm, said bridge being connected to have the non-adjacent terminals of said identical impedances impressed with a voltage generated in the output circuit of said electron tube, and means responsive to the voltage developed across the other diagonally opposite corners of said bridge to vary the first mentioned capacitor.

3. Means for producing alternating currents of a predetermined standard frequency comprising an electronic tube having an anode, a cathode and at least one control electrode, an electro-mechanical vibrator connected between the cathode and said control electrode, a variable capacitor in shunt with said vibrator, a bridge having a pair of identical impedances in one pair of adjacent arms, a second electro-mechanical vibrator in the third arm and a capacitor shunted by a resistor in the fourth arm, said bridge being connected to have the non-adjacent terminals of said identical impedances impressed with a voltage generated in the output circuit of said electron tube, means for impressing a voltage derived from the other diagonally opposite terminals of said bridge on a phase modifier having its output circuit connected between the grids and cathodes of a pair of three electrode tubes having their anode circuits oppositely energized from the output circuit of said electron tube, means energized in accordance with the difference of the currents in the output circuits of the last mentioned discharged tubes arranged to increase or decrease the capacity of the first mentioned capacitor in accordance with the polarity of said difference.

4. Means for producing alternating currents of a predetermined standard frequency comprising an electronic tube having an anode, a cathode and at least one control electrode, a piezo-electric crystal connected between the cathode and said control electrode, a variable capacitor in shunt with said crystal, a bridge comprising a pair of identical impedances in one pair of adjacent arms, a piezo-electric crystal in the third arm and a capacitor shunted by a resistor in the fourth arm, said bridge being connected to have the non-adjacent terminals of said identical impedances impressed with a voltage generated in the output circuit of said electron tube, means for impressing a voltage derived from the other diagonally opposite terminals of said bridge on a phase modifier having its output circuit between the grids and cathodes of a pair of three electrode tubes having their anode circuits oppositely energized from the output circuit of said electron tube, means energized in accordance with the difference of the currents in the output circuits of the last mentioned discharge tubes arranged to increase or decrease the capacity of the first mentioned capacitor in accordance with the polarity of said difference.

5. Means for producing alternating currents of a predetermined standard frequency comprising an electronic tube having an anode, a cathode and at least one control electrode, an electro-mechanical vibrator connected between the cathode and said control electrode, a variable capacitor in shunt with said vibrator, a bridge having a pair of identical impedances in one pair of adjacent arms, a second electro-mechanical vibrator in the third arm and a capacitor shunted by a resistor in the fourth arm, said bridge being connected to have the non-adjacent terminals of said identical impedances impressed with a voltage generated in the output circuit of said electron tube, means for impressing a voltage derived from the other diagonally opposite terminals of said bridge between the grids and cathodes of a pair of three electrode tubes having their anode circuits oppositely energized from the output circuit of said electron tube, means energized in accordance with the difference of the currents in the output circuits of the last mentioned discharge tubes arranged to increase or decrease the resistance of said resistor in accordance with the polarity of said difference.

6. Means for producing alternating currents of a predetermined standard frequency comprising an electronic tube having an anode, a cathode and at least one control electrode, a piezo-electric crystal connected between the cathode and said control electrode, a variable capacitor in shunt with said crystal, a bridge comprising a pair of identical impedances in one pair of adjacent arms, a piezo-electric crystal in the third arm and a capacitor shunted by a resistor in the fourth arm, said bridge being connected to have the non-adjacent terminals of said identical impedances impressed with a voltage generated in the output circuit of said electron tube, means for impressing a voltage derived from the other diagonally opposite terminals of said bridge between the grids and cathodes of a pair of three electrode tubes having their anode circuits oppositely energized from the output circuit of said electron tube, means energized in accordance with the difference of the currents in the output circuits of the last mentioned discharge tubes arranged to increase or decrease the resistance of said resistor in accordance with the polarity of said difference.

THOMAS A. READ.